(12) United States Patent
Boucher

(10) Patent No.: US 7,483,932 B1
(45) Date of Patent: Jan. 27, 2009

(54) METHOD AND SYSTEM FOR COMPUTING MULTIDIMENSIONAL FAST FOURIER TRANSFORMS

(75) Inventor: Michael L. Boucher, Lafayette, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 628 days.

(21) Appl. No.: 10/840,468

(22) Filed: May 5, 2004

(51) Int. Cl.
*G06F 17/14* (2006.01)
(52) U.S. Cl. ...................................... 708/401; 708/403
(58) Field of Classification Search ................. 708/401, 708/403
See application file for complete search history.

(56) References Cited

U.S. PATENT DOCUMENTS

| | | | | |
|---|---|---|---|---|
| 4,601,006 | A * | 7/1986 | Liu | 708/401 |
| 5,905,660 | A * | 5/1999 | Choi et al. | 708/402 |
| 6,021,420 | A * | 2/2000 | Takamuki | 708/401 |
| 6,631,168 | B2 * | 10/2003 | Izumi | 375/295 |
| 2003/0088600 | A1 * | 5/2003 | Lao et al. | 708/520 |

OTHER PUBLICATIONS

Charles Van Loan, *Computational Frameworks for the Fast Fourier Transform*, Society for Industrial and Applied Mathematics, Philadelphia, PA, 1992.
E. Oran Brigham, *The Fast Fourier Transform and Its Applications*, Prentice Hall Signal Processing Series, Prentice-Hall, Inc., 1988, ISBN 0-13-307505-2.

* cited by examiner

*Primary Examiner*—Tan V Mai
(74) *Attorney, Agent, or Firm*—Sonnenschein Nath & Rosenthal LLP

(57) ABSTRACT

Methods, systems, and articles of manufacture consistent with the present invention compute a multidimensional fast Fourier transform of an original matrix having rows and columns of data. The original matrix is divided into a number of blocks of data, each block including at least one datum, the number of rows of data in each block being less than a total number of rows of data in the original matrix. A one-dimensional partial fast Fourier transform of each block in a row of blocks is computed. A result of the computations is stored in a resultant matrix having rows and columns. The resultant matrix is transposed to a transposed matrix having rows and columns. While transposing the resultant matrix, one-dimensional partial fast Fourier transforms of each block of subsequent rows of blocks are simultaneously computed, one row of blocks at a time, until one-dimensional partial fast Fourier transforms are computed for each block.

33 Claims, 12 Drawing Sheets

Figure 4

COLUMNS (N)

130 n=0  n=1  n=2  n=3  n=4  n=5  n=6  n=7

ROWS (M)

m=0
m=1
m=2
m=3
m=4
m=5
m=6
m=7

ORIGINAL MATRIX

BLOCK ROWS FROM TRANSPOSED MATRIX

_US 7,483,932 B1_

METHOD AND SYSTEM FOR COMPUTING MULTIDIMENSIONAL FAST FOURIER TRANSFORMS

FIELD OF THE INVENTION

The present invention relates generally to processing fast Fourier transforms and, more particularly, to methods and systems for computing multidimensional fast Fourier transforms in parallel-processing systems.

BACKGROUND OF THE INVENTION

The multidimensional Fast Fourier Transform (FFT) is a widely-used computational tool. For example, the FFT has been applied to solve problems in signal processing, applied mechanics, sonics, acoustics, biomedical engineering, radar, communications, and the analysis of stock market data.

However, when a multidimensional FFT algorithm is implemented in a program code that is executed in a data processing system, the FFT computation typically accounts for a substantial percentage of the run-time of the program code. A conventional approach to reduce the computation time is to parallelize the FFT computation to execute concurrently on more than one processor.

Given a matrix F that has M rows and N columns, a typical approach to compute the FFT of matrix F is shown in the following steps:

1.) perform N one-dimensional FFTs of length M on the columns of the original matrix;
2.) transpose the resultant matrix;
3.) perform M one-dimensional FFTs of length N on the columns of the transposed matrix; and
4.) transpose the new resultant matrix.

Another conventional approach to compute the FFT of matrix F is shown in the steps below:

1.) perform M one-dimensional FFTs of length N on the rows of the original matrix;
2.) transpose the resultant matrix;
3.) perform N one-dimensional FFTs of length M on the rows of the transposed matrix; and
4.) transpose the new resultant matrix.

Both of these conventional FFT algorithms suffer from a performance problem on parallel-processing systems. Namely, when a processor completes one of the steps, the processor typically stops and waits for the other processors to complete that step before proceeding to the next step. For example, a processor does not begin transposing the matrix in step 2 until all processors have completed performing the FFTs in step 1; step 3 does not begin until all processors have completed step 2; and step 4 does not begin until all processors have completed step 3. Therefore, in a highly-parallel system, hundreds of processors may go idle waiting for the last processor to finish one of the steps. This, in turn, leads to a substantial loss of computational efficiency.

SUMMARY OF THE INVENTION

Methods, systems, and articles of manufacture consistent with the present invention efficiently compute a multidimensional fast Fourier transform in a parallel-processor data processing system. To compute a multidimensional fast Fourier transform of an original matrix, input vectors of the original matrix are divided into blocks. For example, each column of the original matrix is divided into a number of blocks. One-dimensional partial FFTs of a row of blocks are then computed, such that each block in the row of blocks is in a different column of the matrix. In a multi-processor data processing system, multiple processors can simultaneously process the partial FFTs of the row of blocks. The results of the partial FFTs of the blocks are then transposed. While the transposition is performed by one or more processors, one or more other processors can simultaneously process the partial FFTs of the next row of blocks.

Since the rows or columns of the original matrix are divided into blocks, and partial FFTs of a set of blocks are computed, the partial FFTs are finished faster than if the FFTs would be computed for an entire row or column of the original matrix. Therefore, processors can begin transposing the results of the partial FFTs of the blocks sooner than the conventional case, in which the processors have to wait until the results of the FFTs of entire rows or columns are completed.

In accordance with methods consistent with the present invention, a method in a data processing system having a program for computing a multidimensional fast Fourier transform of an original matrix having rows and columns of data is provided. The method comprises the steps of: dividing the original matrix into a number of blocks of data, each block including at least one datum, the number of rows of data in each block being less than a total number of rows of data in the original matrix; computing a one-dimensional partial fast Fourier transform of each block in a row of blocks, a result of the computations being stored in a resultant matrix having rows and columns; transposing the resultant matrix to a transposed matrix having rows and columns; and while transposing the resultant matrix, simultaneously computing one-dimensional partial fast Fourier transforms of each block of subsequent rows of blocks, one row of blocks at a time, until one-dimensional partial fast Fourier transforms are computed for each block.

In accordance with methods consistent with the present invention, a method in a data processing system having a program for computing a multidimensional fast Fourier transform of an original matrix having rows and columns of data is provided. The method comprises the steps of: dividing the original matrix into a number of blocks of data, each block including at least one datum, the number of columns of data in each block being less than a total number of columns of data of the original matrix; computing a one-dimensional partial fast Fourier transform of each block in a column of blocks, a result of the computations being stored in a resultant matrix having rows and columns; transposing the resultant matrix to a transposed matrix having rows and columns; and while transposing the resultant matrix, simultaneously computing one-dimensional partial fast Fourier transforms of each block of subsequent columns of blocks, one column of blocks at a time, until one-dimensional partial fast Fourier transforms are computed for each block.

In accordance with articles of manufacture consistent with the present invention, a computer-readable medium containing instructions that cause a data processing system having a program to perform a method for computing a multidimensional fast Fourier transform of an original matrix having rows and columns of data is provided. The method comprises the steps of: dividing the original matrix into a number of blocks of data, each block including at least one datum, the number of rows of data in each block being less than a total number of rows of data in the original matrix; computing a one-dimensional partial fast Fourier transform of each block in a row of blocks, a result of the computations being stored in a resultant matrix having rows and columns; transposing the resultant matrix to a transposed matrix having rows and columns; and while transposing the resultant matrix, simultaneously computing one-dimensional partial fast Fourier transforms of each block of subsequent rows of blocks, one row of blocks at a time, until one-dimensional partial fast Fourier transforms are computed for each block.

In accordance with articles of manufacture consistent with the present invention, a computer-readable medium containing instructions that cause a data processing system having a program to perform a method for computing a multidimensional fast Fourier transform of an original matrix having rows and columns of data is provided. The method comprises the steps of: dividing the original matrix into a number of blocks of data, each block including at least one datum, the number of columns of data in each block being less than a total number of columns of data of the original matrix; computing a one-dimensional partial fast Fourier transform of each block in a column of blocks, a result of the computations being stored in a resultant matrix having rows and columns; transposing the resultant matrix to a transposed matrix having rows and columns; and while transposing the resultant matrix, simultaneously computing one-dimensional partial fast Fourier transforms of each block of subsequent columns of blocks, one column of blocks at a time, until one-dimensional partial fast Fourier transforms are computed for each block.

In accordance with systems consistent with the present invention, a data processing system for computing a multidimensional fast Fourier transform of an original matrix having rows and columns of data is provided. The data processing system comprises a memory comprising a program that: divides the original matrix into a number of blocks of data, each block including at least one datum, the number of columns of data in each block being less than a total number of columns of data of the original matrix; computes a one-dimensional partial fast Fourier transform of each block in a column of blocks, a result of the computations being stored in a resultant matrix having rows and columns; transposes the resultant matrix to a transposed matrix having rows and columns; and while transposing the resultant matrix, simultaneously computes one-dimensional partial fast Fourier transforms of each block of subsequent columns of blocks, one column of blocks at a time, until one-dimensional partial fast Fourier transforms are computed for each block. The data processing system further comprises a processing unit that runs the program.

In accordance with systems consistent with the present invention, a data processing system for computing a multidimensional fast Fourier transform of an original matrix having rows and columns of data is provided. The data processing system comprises a memory having a program that: divides the original matrix into a number of blocks of data, each block including at least one datum, the number of columns of data in each block being less than a total number of columns of data of the original matrix; computes a one-dimensional partial fast Fourier transform of each block in a column of blocks, a result of the computations being stored in a resultant matrix having rows and columns; transposes the resultant matrix to a transposed matrix having rows and columns; and while transposing the resultant matrix, simultaneously computes one-dimensional partial fast Fourier transforms of each block of subsequent columns of blocks, one column of blocks at a time, until one-dimensional partial fast Fourier transforms are computed for each block. The data processing system further comprises a processing unit that runs the program.

In accordance with systems consistent with the present invention, a data processing system for computing a multidimensional fast Fourier transform of an original matrix having rows and columns of data is provided. The data processing system comprises: means for dividing the original matrix into a number of blocks of data, each block including at least one datum, the number of rows of data in each block being less than a total number of rows of data in the original matrix; means for computing a one-dimensional partial fast Fourier transform of each block in a row of blocks, a result of the computations being stored in a resultant matrix having rows and columns; means for transposing the resultant matrix to a transposed matrix having rows and columns; and means for, while transposing the resultant matrix, simultaneously computing one-dimensional partial fast Fourier transforms of each block of subsequent rows of blocks, one row of blocks at a time, until one-dimensional partial fast Fourier transforms are computed for each block.

Other features of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 4 depicts an illustrative original matrix;

DETAILED DESCRIPTION OF THE INVENTION

Reference will now be made in detail to an implementation in accordance with methods, systems, and articles of manufacture consistent with the present invention. Wherever possible, the same reference numbers will be used throughout the drawings and the following description to refer to the same or like parts.

Methods, systems, and articles of manufacture consistent with the present invention efficiently compute a multidimensional fast Fourier transform in a parallel-processor data processing system. Prior to computing compute a multidimensional fast Fourier transform of an original matrix, input vectors of the original matrix are divided into blocks. For example, the columns of the original matrix are each divided into a number of blocks. One-dimensional partial FFTs of a row of blocks are then computed, such that each block in the row is in a different column of the matrix. In a multi-processor data processing system, multiple processors can simultaneously process the partial FFTs of the row of blocks. The results of the partial FFTs of the blocks are then transposed. While the transposition is performed by one or more processors, one or more other processors can simultaneously process the partial FFTs of the next row of blocks. Therefore, methods, systems, and articles of manufacture consistent with the present invention provide improved processing efficiency compared to conventional approaches that compute the FFT for an entire row or column of an input matrix.

Figure 1:
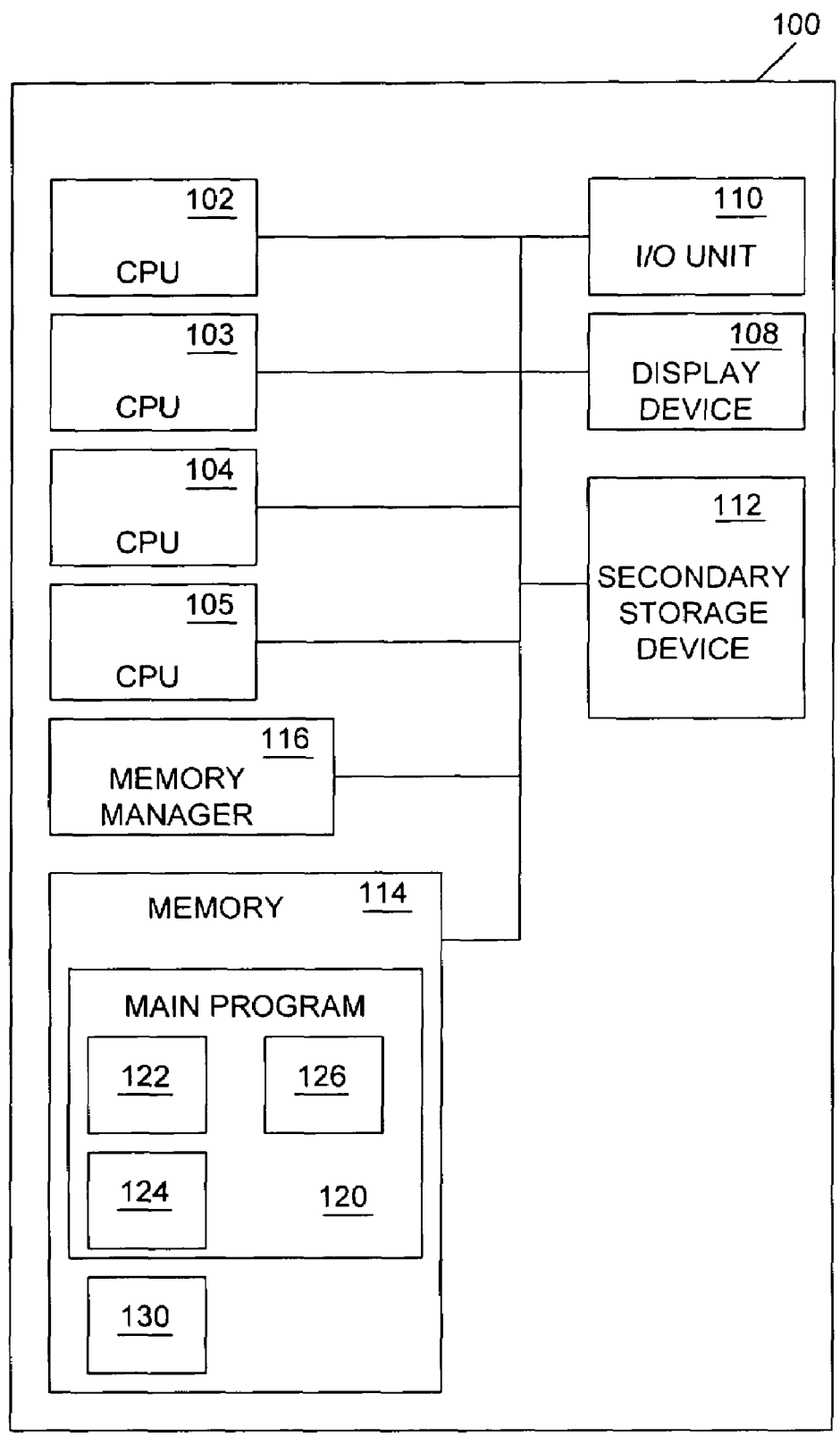
FIG. 1 depicts a block diagram of a data processing system consistent with the present invention.

FIG. 1 depicts a schematic diagram of a data processing system 100 suitable for computing a fast Fourier transform consistent with the present invention. As shown, data processing system 100 comprises four central processing units (CPU) 102, 103, 104 and 105 operating as parallel processors. However, one having skill in the art will appreciate that the data processing system includes at least one CPU, such as CPU 102, and can include a different number of processors than as shown in the illustrative example of FIG. 1. Further, one or more of the CPUs may be located on a remote system that communicates with data processing system 100. Data processing system 100 further comprises a display device 108, an input/output (I/O) unit 110, a secondary storage device 112, a memory 114, and a memory manager 116 for managing the CPUs' access to memory 114. The data processing system may further comprise standard input devices such as a keyboard, a mouse or a speech-processing means (each not illustrated).

Memory 114 comprises a main program 120 for computing a multidimensional FFT in accordance with methods and systems consistent with the present invention. As will be described in more detail below, the main program divides a matrix into blocks, computes one-dimensional partial FFTs of the blocks in each row or column of blocks of the matrix, the results of the partial FFTs being stored in a resultant matrix, and transposes the resultant matrix to a final matrix. The main program comprises an FFT computation module 122 and a transpose module 124. The CPUs may each use an instance of the FFT computation module to perform a partial FFT computation on a block of data and may each use an instance of the transpose module to transpose the FFT results for a row or column of blocks. Instances of the FFT computation module and the transpose module are assigned by a work assignment program 126 to respective CPUs as those CPUs become available to perform tasks. Thus, as will be described below, the CPUs can process the main program in parallel. The work assignment program can be a part of the main program or can be a separate program or module. Work assignment programs and their functionality to control work flow to parallel processors are known in the art and will not be described in more detail herein.

One having skill in the art will appreciate that the main program can reside in a memory on a system other than data processing system 100. Main program 120 may comprise or may be included in one or more code sections containing instructions for performing their respective operations. While main program 120 is described as being implemented as software, the present implementation may be implemented as a combination of hardware and software or hardware alone.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing system 100 have been described, one having skill in the art will appreciate that a data processing system suitable for use with methods, systems, and articles of manufacture consistent with the present invention may contain additional or different components.

Figure 2:
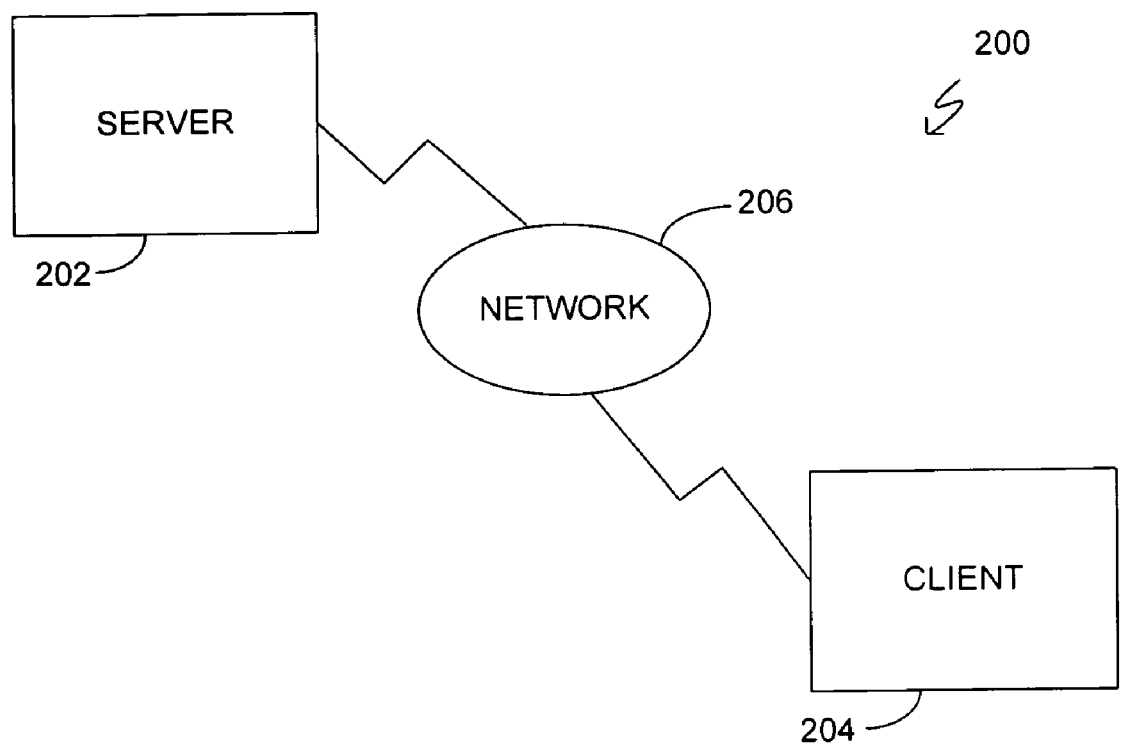
FIG. 2 shows a block diagram of a client-server data processing system consistent with the present invention.

Data processing system 100 may also be implemented in a client-server environment, like the one shown in FIG. 2. FIG. 2 depicts a block diagram of a client-server data processing system 200. A server 202 and a client 204 are each connected to a network 206, such as a Local Area Network, Wide Area Network, or the Internet. At least a portion of, for example, the main program can be stored on the client, while some or all steps of the processing can be carried out on the server, which is accessed by the client via the network. The client and server can each comprise components similar to those described above with respect to data processing system 100, such as a CPU, an I/O, a memory, a secondary storage, and a display device.

Figure 3:
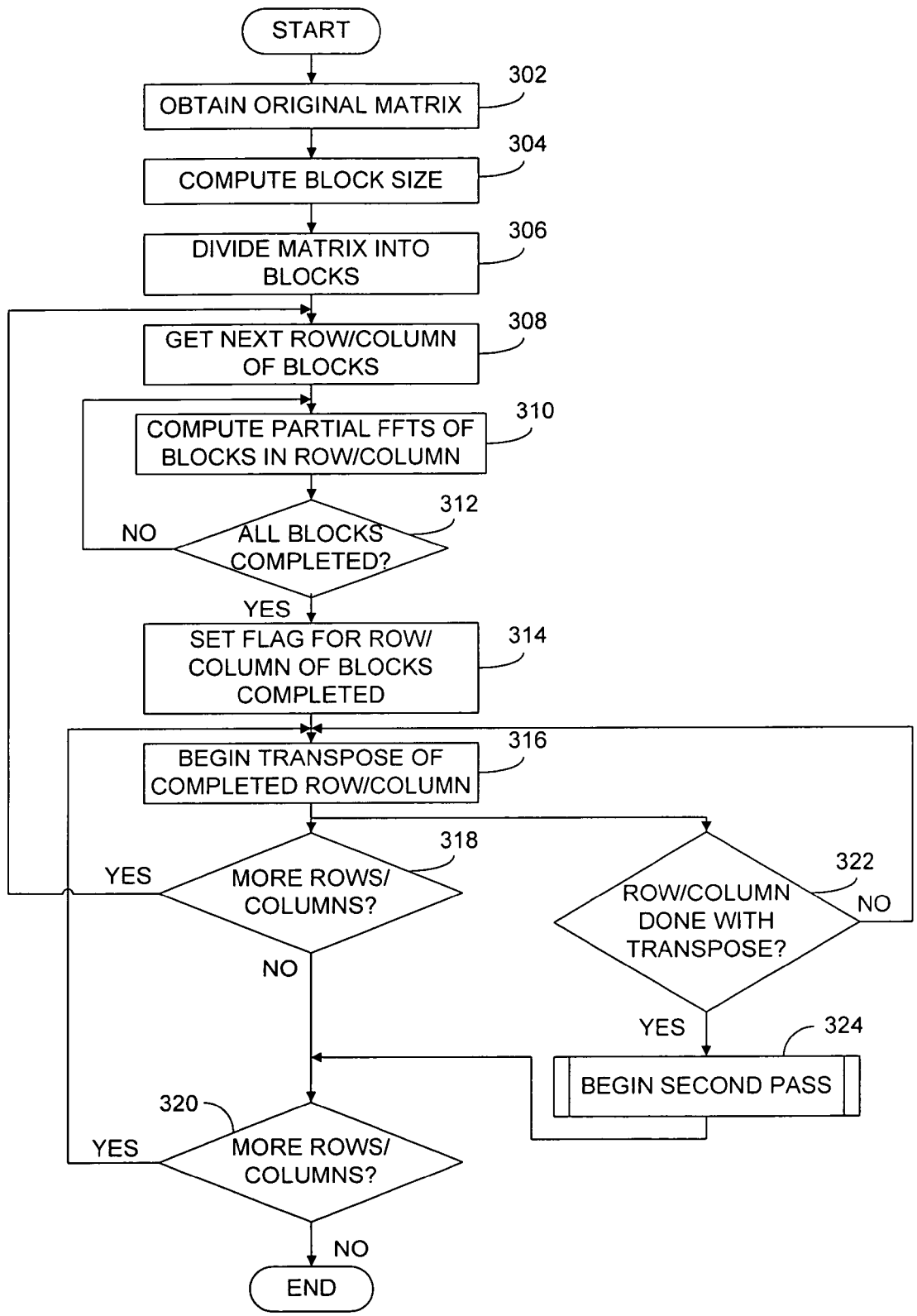
FIG. 3 depicts a flow diagram of the exemplary steps performed by the main program consistent with the present invention.

FIG. 3 depicts a flow diagram illustrating the exemplary steps performed by the main program for computing a multidimensional FFT. As an illustrative example, the exemplary steps performed by the main program will be described below with reference to an illustrative two-dimensional original matrix 130 of data, as shown in FIG. 4. The illustrative matrix has M=8 rows and N=8 columns and is stored, for example, in memory 114. However, the number of dimensions, rows and columns of the matrix in FIG. 4 are merely illustrative. Other matrices are described below, such as a resultant matrix, a transposed matrix, and a final matrix. Each of the matrices described herein can be stored in the memory, in the secondary storage device, or at a different location, such as on a remote data processing system.

Figure 12:
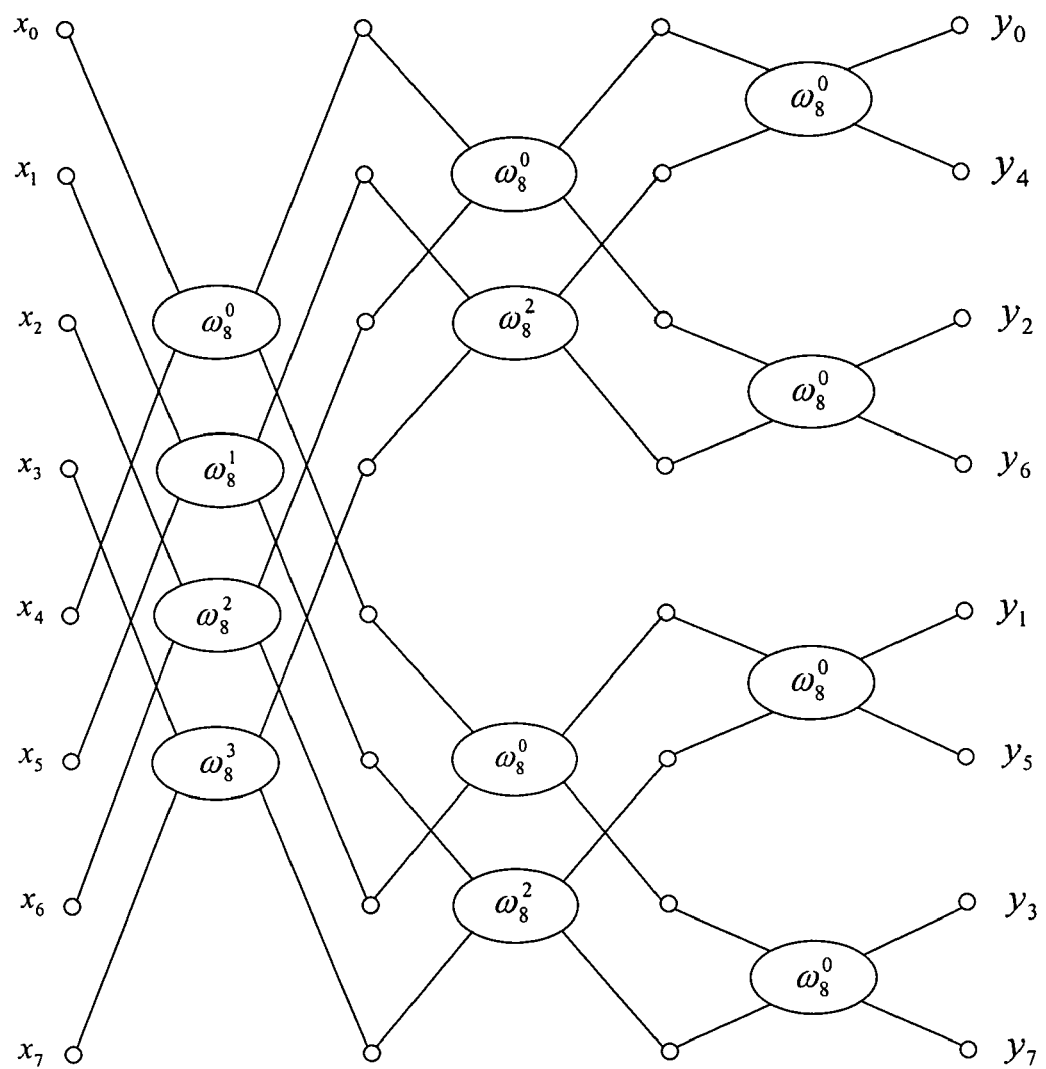
FIG. 12 shows an illustrative butterfly diagram showing the computations for performing an n=8 FFT.

Fast Fourier transforms and the equations used for their computation are known to one having skill in the art and will not be described herein. Description of fast Fourier transforms can be found in E. Oran Brigham, "The Fast Fourier Transform and its Applications," Prentice-Hall, Inc., 1988; and Charles Van Loan, "Computational Frameworks for the Fast Fourier Transform," Frontiers in Applied Mathematics, Vol. 10, Society for Industrial and Applied Mathematics, ISBN 0-89871-285-8, 1992, each of which is incorporated herein by reference to the extent permitted by law. FIG. 12 depicts a butterfly diagram showing an illustrative sequence of computations used by the main program to compute an n=8 FFT, such as for the illustrative example.

Referring back to FIG. 3, first, the main program obtains the original matrix (step 302). This is performed, for example, by obtaining the original matrix as a data structure in the memory. As will be described in more detail below, to compute the FFT of the original matrix, the program performs a one-dimensional FFT on each column or row of the original matrix. However, unlike conventional methods and systems, prior to performing the one-dimensional FFTs on the columns, the main program divides the original matrix into blocks of data that each have a length smaller than the length of the columns and a width smaller than the width of the rows.

Figure 5:
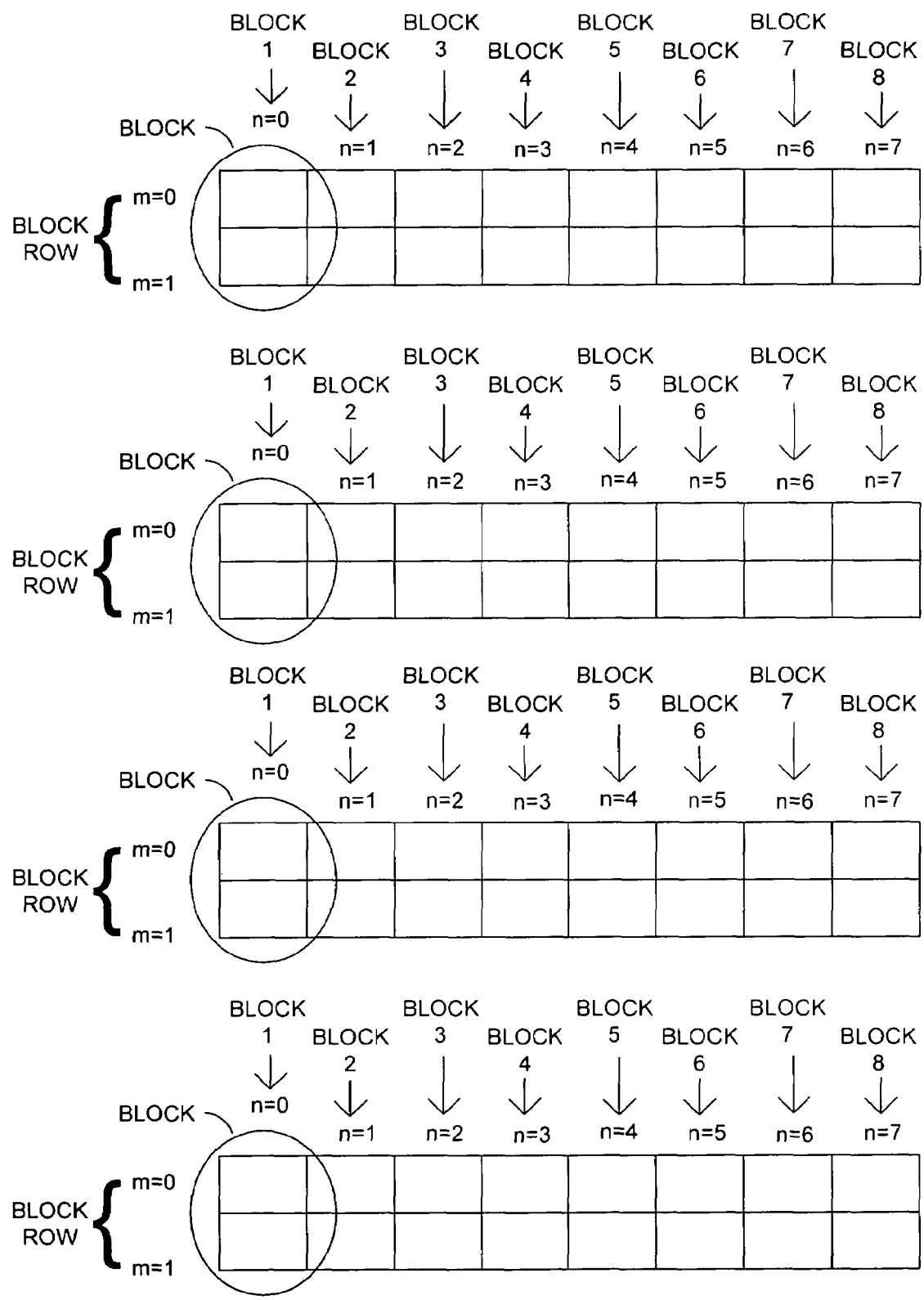
FIG. 5 shows the original matrix of FIG. 4 divided into blocks.

In the illustrative example, the original matrix is an 8×8 matrix. The main program divides the original matrix into for rows of blocks, with each block being a 2×1 block of the data of the original matrix. Thus, the columns of the original matrix, which have lengths equal to 8, are divided into blocks of length 2, as shown in FIG. 5. Accordingly, in the illustrative example, the main program computes the one-dimensional partial FFTs for each block in a row of blocks across the columns of the matrix before proceeding to the next now of blocks. For example as shown in FIG. 5, the main program computes partial FFTs for a row of blocks (i.e., blocks forming a row across columns 0-7), before proceeding on to the next row of blocks. Therefore, unlike conventional methods and systems, the main program does not exhibit the processing delays associated with computing the one-dimensional FFTs for each entire column.

The main program can divide the original matrix into blocks having a different sizes in each dimension. That is the blocks do not have to be square. For convenience, the case in which the main program divides the columns of a matrix into blocks will be illustratively used herein. However, the main program may alternatively divide the rows of a matrix into blocks and compute the partial FFTs for a column of the blocks.

After the main program obtains the original matrix in step 302, the main program computes the block size for each dimension (for example, the blocking in the X and Y directions can be different or the same) (step 304). Then, the main program divides the original matrix into the blocks (step 306), and identifies the next row (or column) of blocks for which the main program will compute one-dimensional partial FFTs (step 308). In the illustrative example, the main program begins with the first row of blocks.

Then, the main program computes a one-dimensional partial FFT for each block of the row of blocks (step 310). As each CPU becomes available, the CPUs can compute the partial FFTs for the respective blocks in the row. For example, if the data processing system has one CPU, the CPU would compute the partial FFT for each block in the row. However, if the data processing system has multiple CPUs that can operate in parallel, the CPUs can each compute a partial FFT for a different block in the row in parallel. In the illustrative example, the data processing system has four CPUs. If all four CPUs are available to take on work, then the four CPUs could compute the partial FFTs for the blocks, for example, in columns 0-3. When one of the CPUs completes computing the partial FFT for a block, then it can start computing the partial FFT for the next remaining block in the row, such as the block in column 4.

When a CPU is a available to perform a partial FFT, the CPU reserves the column or row of blocks for which it will make the computation. This prevents another CPU from working on computing a partial FFT on that row or column. Reserving a row or column does not inhibit other processors from doing transposes into or out of completed blocks in the row or column.

Figure 6:
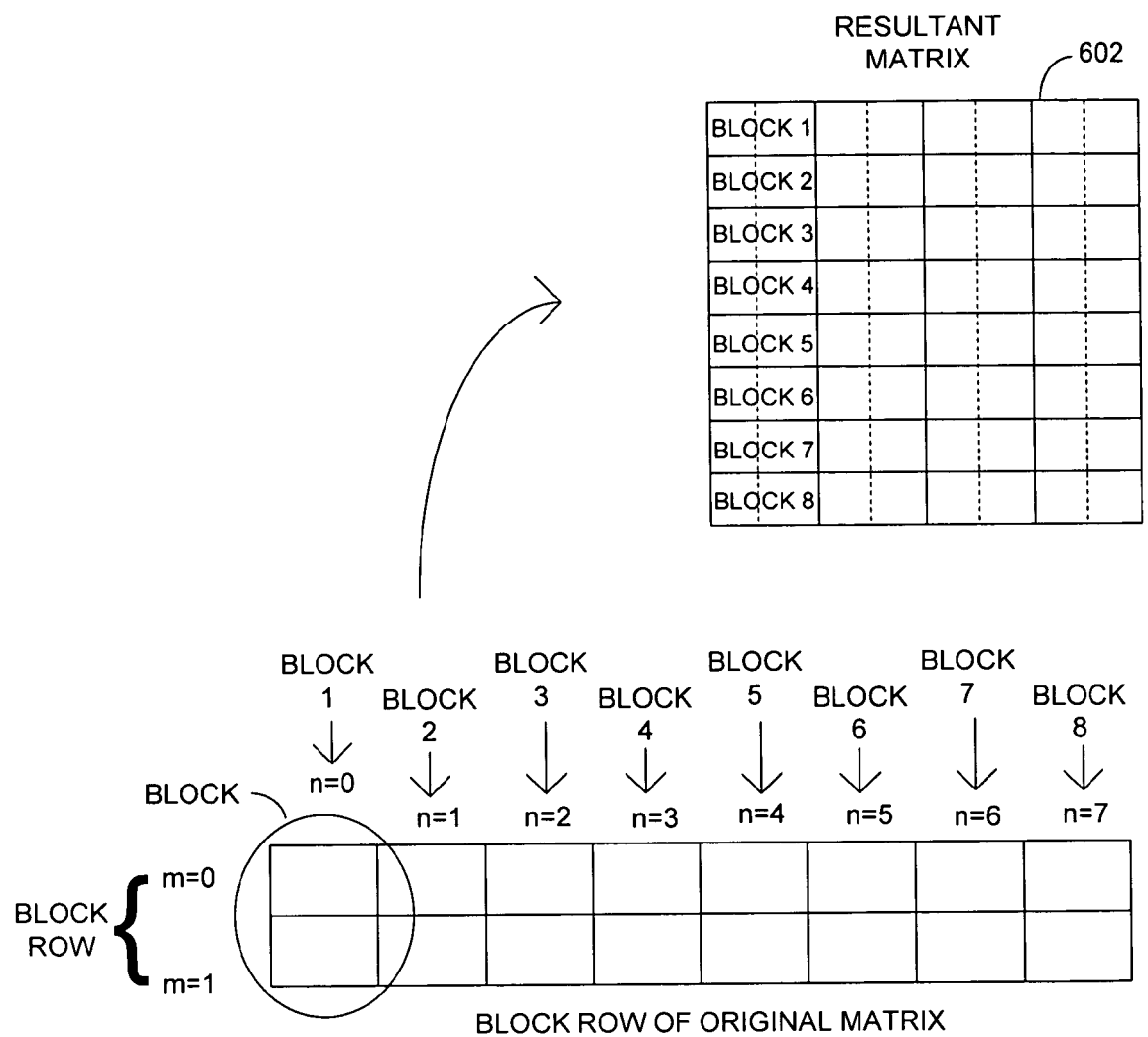
FIG. 6 illustrates a functional block diagram of an FFT computation of a row of blocks of the original matrix.

The results of the one-dimensional partial FFTs for each block are stored in a resultant matrix, such as the illustrative resultant matrix 602 depicted in FIG. 6. As shown in FIG. 6, the results for the partial FFTs of the first row of blocks are stored in the first column of the resultant matrix. Results of partial FFT computations for additional rows of blocks are stored in corresponding additional columns of the resultant matrix. Accordingly, the number of columns of the resultant matrix equals the number of rows of the original matrix, and the number of rows of the resultant matrix equals the number of columns of the original matrix. In the illustrative example, the resultant matrix is therefore an 8×8 matrix. Further, the resultant matrix can be the same matrix as the original matrix, for example in a case in which the main program implements an in-place FFT. In that case, the main program overwrites the inputted elements of the original matrix with the partial FFT results. In the case of an out-of-place FFT, the resultant matrix can be a different matrix than the original matrix.

The main program keeps track of the blocks for which partial FFTs have been completed by updating flags for the respective blocks. Alternatively, the main program can use a different device for keeping track of the completed partial FFTs for the blocks, such as a table or a semaphore.

If the main program has not completed computing partial FFTs for all of the blocks in a row (step 312), then the main program continues to compute the partial FFTs until the computations for all the blocks are completed. After the partial FFTs have been computed for the entire row, then the main program sets a flag in memory indicating that the partial FFTs for that row are finished (step 314).

Then, the main program begins transposing the results for a row or column of blocks for which partial FFTs have been completed (step 316). In other words, after the partial FFTs for a row of blocks have been completed and stored in the resultant matrix, the results of the partial FFTs in the resultant matrix are available for one or more CPUs to begin transposing to a transpose matrix. Similar to the partial FFT computations, the transpose operations are performed via program threads executed by the various CPUs. Thus, one or more CPUs can perform the transpositions while one or more other CPUs continue computing partial FFTs on blocks of the original matrix. Each available CPU can transpose a block of the resultant matrix in parallel with other CPUs. In the illustrative example, if all four CPUs are available to take on work, then the four CPUs could each transpose, for example, blocks 1-4 of column 1 of the resultant matrix to blocks 1-4 of row 1 of the transpose matrix. When one of the CPUs completes transposing a block, then it can start transposing the next remaining block in the resultant matrix.

When a CPU is a available to transpose a block, the CPU reserves the block for which it will make the transposition. This prevents another CPU from reading or writing data in the block.

Figure 7:
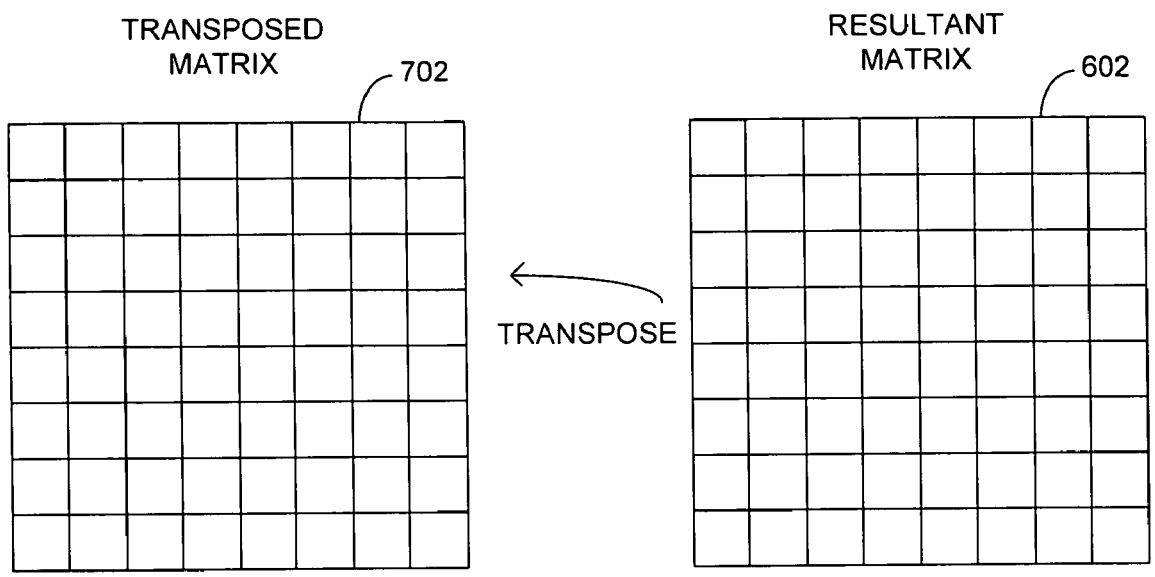
FIG. 7 depicts an illustrative resultant matrix and an illustrative transposed matrix.

Available CPUs continue to transpose the blocks of the resultant matrix until the transposition is complete, however, while the transposition is taking place, if there is another row of blocks in the original matrix for which partial FFTs have not been computed, then the main program also begins computing partial FFTs for that row of blocks (step 318). That is, if there is another row of blocks, while simultaneously transposing the resultant matrix, the main program execution returns to step 308 to identify the next row of blocks and to compute the partial FFTs for that row of blocks. For example, while one or more CPUs transpose the resultant matrix vector for the first row of blocks, one or more CPUs can simultaneously compute the partial FFTs for the second row of blocks. Therefore, available CPUs do not remain idle while the resultant matrix is transposed—instead available CPUs can compute partial FFTs for the next row of blocks of the original matrix. The transposition of resultant matrix 602 to the transposed matrix 702 is illustratively shown in FIG. 7.

Referring back to FIG. 3, the main program continues to compute the partial FFTs for unfinished rows of blocks until all rows are completed (step 318) and continues to transpose the blocks of the resultant matrix until the transposition for all columns or rows of the transposed matrix are completed (step 320).

When a row or columns of blocks of the transposed matrix is completed, that row or column is available for a second FFT pass (step 322). That is, while simultaneously transposing the resultant matrix, available CPUs can begin computing partial FFTs on the blocks of completed rows or columns of the transposed matrix (step 324). The processing of step 324 is described below in more detail with reference to FIG. 8.

Figure 8:
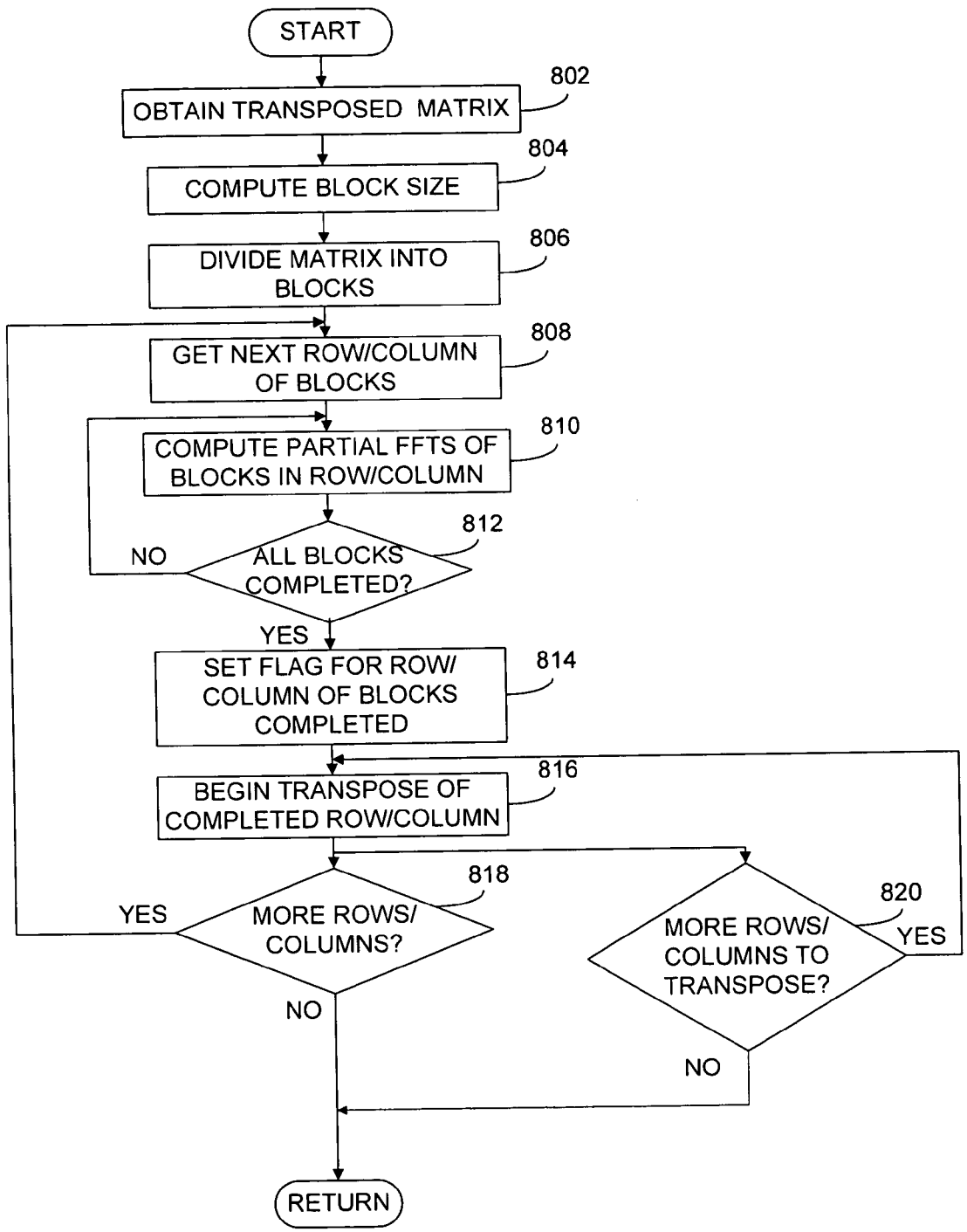
FIG. 8 depicts a flow diagram of the exemplary steps performed by the main program for computing a second FFT pass consistent with the present invention.

Referring to FIG. 8, similar to the processing of the original matrix, the main program divides the transpose matrix into blocks, computes one-dimensional partial FFTs for each row or column of blocks of the transposed matrix, the results of the partial FFTs being stored in a new resultant matrix, and transposes the new resultant matrix to a final matrix.

Figure 9:
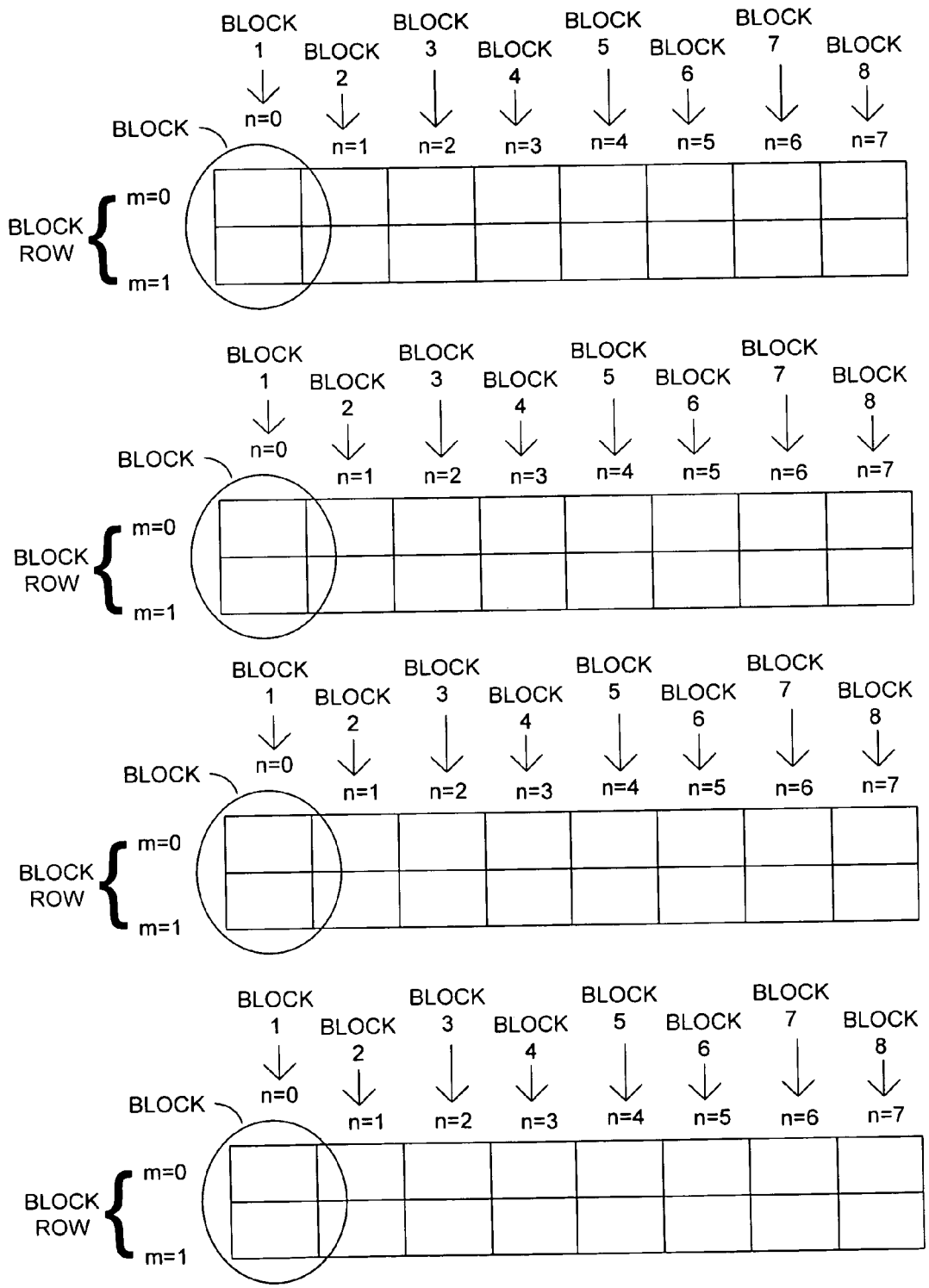
FIG. 9 shows the transposed matrix of FIG. 7 divided into blocks.

Accordingly, during the second FFT pass, the main program obtains the transposed matrix (step 802) in a manner similar to obtaining the original matrix as discussed above. Then, the main program computes the size of the blocks of the transposed matrix (step 804) and divides the transposed matrix into blocks of data (step 806). In the illustrative example, the main program divides the transposed matrix's columns, which have lengths equal to 8, into blocks of length 2, as shown in FIG. 9. Accordingly, the main program computes the one-dimensional partial FFTs for each block in a row of blocks across the columns of the matrix before proceeding to the next now of blocks. For example as shown in FIG. 9, the main program computes a row of blocks (e.g., the first row of blocks) of the transposed matrix, before proceeding on to the next row of blocks (e.g., the second row of blocks).

After the main program the transposed matrix into blocks in step 306, the main program identifies the next row or column of blocks for which the main program will compute one-dimensional partial FFTs (step 808). For example, the main program begins with the first row of blocks.

Then, the main program computes a one-dimensional partial FFT on each block of the row of blocks (step 310). As described above with reference to processing the first FFT pass, as each CPU becomes available, the CPUs can compute the partial FFTs on the respective blocks in the row of the transposed matrix. If the data processing system has multiple CPUs that can operate in parallel, the CPUs can each compute a partial FFT for a different block in the row in parallel.

Figure 10:
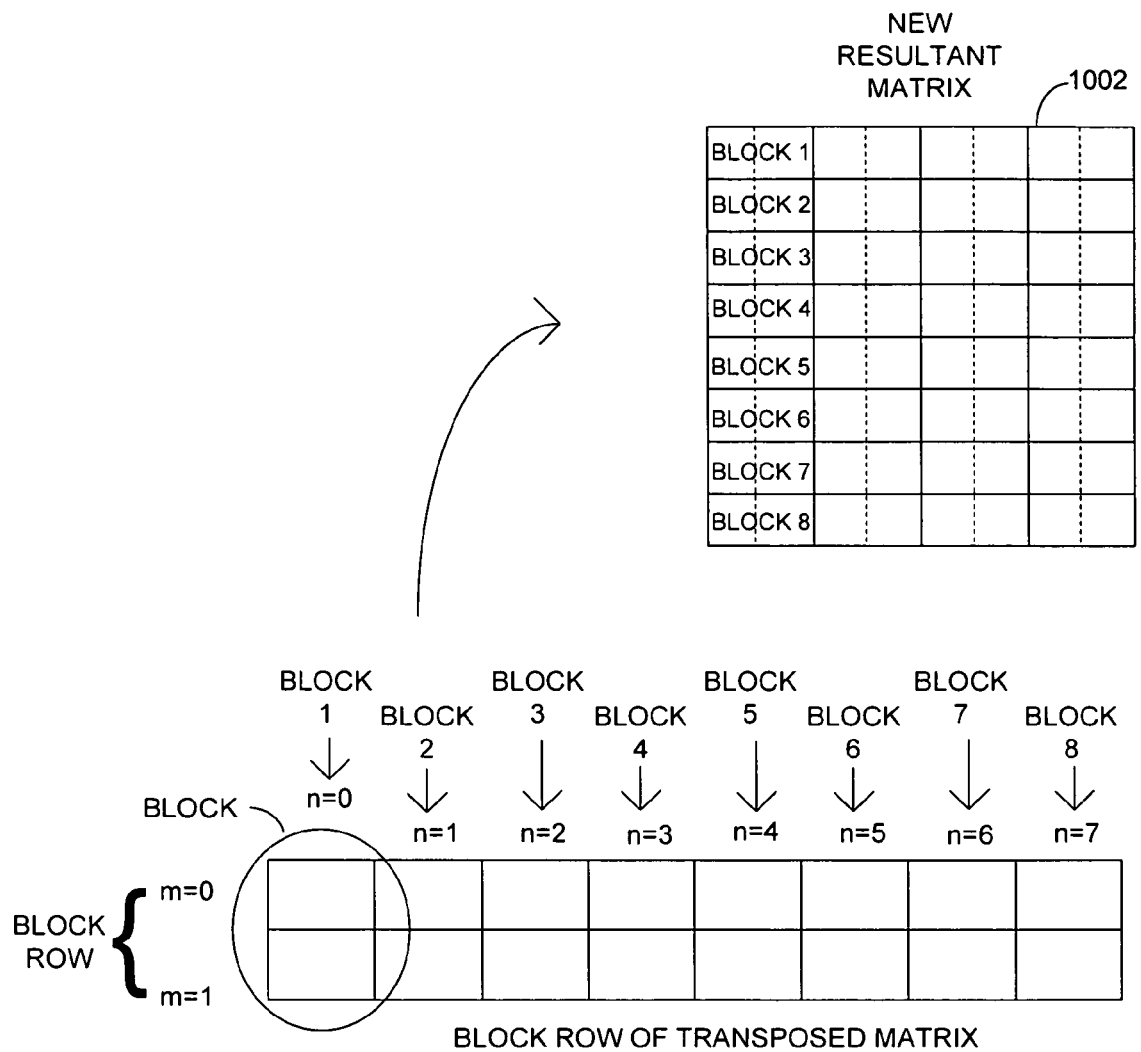
FIG. 10 shows a functional block diagram of an FFT computation of a row of blocks of the transposed matrix.

The results of the one-dimensional partial FFTs for each block of the transposed matrix are stored in a new resultant matrix, such as the illustrative new resultant matrix 1002 depicted in FIG. 10. As shown in FIG. 10, the results of the partial FFTs of the first row of blocks are stored in the first column of the new resultant matrix. Results of partial FFT computations for additional rows of blocks are stored in corresponding additional columns of the new resultant matrix. Accordingly, the number of columns of the new resultant matrix equals the number of rows of the transposed matrix, and the number of rows of the new resultant matrix equals the number of columns of the transposed matrix. In the illustrative example, the new resultant matrix is therefore an 8×8 matrix. Further, the new resultant matrix can be the same matrix as the transposed matrix, for example in a case in which the main program implements an in-place FFT. In that case, the main program overwrites the inputted elements of the transposed matrix with the partial FFT results. In the case of an out-of-place FFT, the new resultant matrix can be a different matrix than the transposed matrix.

The main program keeps track of the blocks for which partial FFTs have been completed by updating flags for the respective blocks. Alternatively, the main program can use a different device for keeping track of the completed partial FFTs for the blocks, such as a table or a semaphore.

If the main program has not completed computing partial FFTs for all of the blocks in a row of the transposed matrix (step 812), then the main program continues to compute the partial FFTs until the computations for all the blocks are completed. After the partial FFTs have been computed for the entire row, then the main program sets a flag in memory indicating that the partial FFTs for that row are finished (step 814).

The main program then begins transposing a completed row or column of the new resultant matrix (step 816). One or more CPUs that are available to process work begin transposing the new resultant matrix into a final matrix 1102. Similar to the parallel computing of the partial FFTs for a row of blocks, each available CPU can transpose a block of the new resultant matrix in parallel with the other CPUs. In the illustrative example, if all four CPUs are available to take on work, then the four CPUs could each transpose, for example, blocks 1-4 of column 1 of the new resultant matrix to blocks 1-4 of row 1 of the final matrix. When one of the CPUs completes transposing a block, then it can start transposing the next remaining block of the new resultant matrix.

Figure 11:
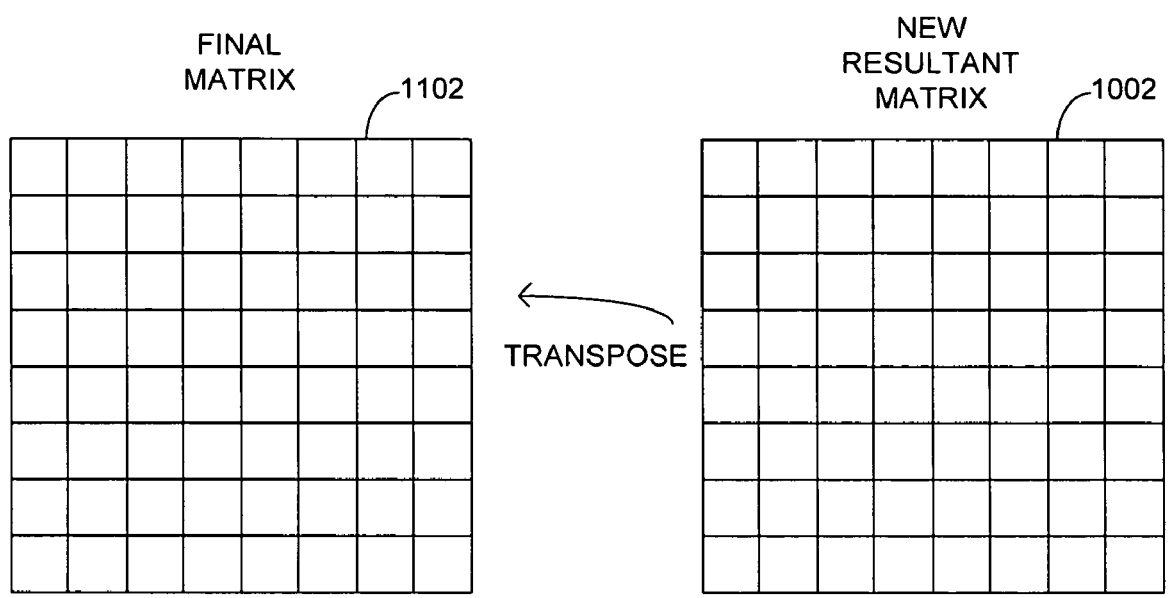
FIG. 11 depicts an illustrative new resultant matrix and an illustrative final matrix.

The main program continues to transpose the blocks of the new resultant matrix until the transposition is complete. However, while the transposition is taking place, if there is another row of blocks in the transposed matrix for which partial FFTs have not been computed, then the main program can begin computing partial FFTs for that row of blocks (step 818). That is, if there is another row of blocks, while simultaneously transposing the new resultant matrix, the main program execution returns to step 808 to identify the next row of blocks of the transposed matrix and to compute the partial FFTs for that row. For example, while one or more CPUs transpose the new resultant matrix vector for the first row of blocks, one or more CPUs can simultaneously compute the partial FFTs for the second row of blocks of the transposed matrix. Therefore, available CPUs do not remain idle while the new resultant matrix is transposed—instead available CPUs can compute partial FFTs for the next row of blocks of the transposed matrix. The transposition of new resultant matrix 1002 to the final matrix 1102 is illustratively shown in FIG. 11. If there are additional rows or columns of the new resultant matrix to be transposed (step 820), then the main program returns to step 816 to begin transposing an available row or column.

Referring back to FIG. 3, the main program continues to compute the partial FFTs for unfinished rows of blocks of the original matrix until all rows are completed (step 318), continues to transpose the resultant matrix until all blocks are transposed (step 320), and does the same for the transposed matrix and new resultant matrix (step 324) until the second FFT pass is completed.

As described above, the CPUs of conventional methods and system typically sit idle while the FFT for an entire row or column of a matrix is computed and while a resultant matrix is transposed. Methods and systems consistent with the present invention beneficially divide a matrix into blocks that are processed by the CPUs. As the blocks are smaller than the entire rows or columns, the CPUs process the blocks faster than processing entire columns, allowing the CPUs to be available sooner for further processing. Further, methods and systems consistent with the present invention provide for the computing of partial FFTs of blocks and the transposition of resultant matrices at the same time by parallel-processing CPUs that may be available. Accordingly, CPUs are more efficiently used compared to conventional methods and systems.

One having skill in the art will appreciate that the processing steps described above with reference to FIG. 3 are merely illustrative. The processing steps may be performed in a different order than as depicted and additional intervening steps may also be performed. For example, although the main program divides the columns of a matrix into blocks and computes the partial FFTs for a row of blocks, the main program may alternatively divide the rows of a matrix into blocks and compute the partial FFTs for a column of the blocks.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. Further, the illustrative processing steps performed by the program can be executed in an different order than described above, and additional processing steps can be incorporated. The invention may be implemented with both object-oriented and non-object-oriented programming systems. The scope of the invention is defined by the claims and their equivalents.

What is claimed is:

1. A computer-implemented method in a data processing system having a plurality of processors and a program for computing a multidimensional fast Fourier transform of an original matrix having rows and columns of data, the method comprising the steps of:
   dividing the original matrix into a number of blocks of data, each block including at least one datum, the number of rows of data in each block being less than a total number of rows of data in the original matrix;
   a first of the plurality of processors locking a row of blocks and computing a one-dimensional partial fast Fourier transform of each block in the row of blocks, a result of the computations being stored in a resultant matrix having rows and columns;
   a second processor of the plurality of processors transposing the resultant matrix to a transposed matrix having rows and columns, the transposed matrix being a completed multidimensional fast Fourier transform result that is stored in a data structure in a memory of the data processing system; and
   while transposing the resultant matrix, at least a third processor of the plurality of processors simultaneously computing one-dimensional partial fast Fourier transforms of each block of subsequent rows of blocks, one row of blocks at a time, until one-dimensional partial fast Fourier transforms are computed for each block.

2. The method of claim 1, further comprising the steps of:
   dividing the transposed matrix into a number of transposed-matrix blocks, each transposed-matrix block including at least one datum, the number of rows in each transposed-matrix block being less than a total number of rows of the transposed matrix;
   computing a one-dimensional partial fast Fourier transform of each transposed-matrix block in a row of transposed-matrix blocks, a result of the computations being stored in a second resultant matrix having rows and columns;
   transposing the second resultant matrix to a final matrix having rows and columns; and
   while transposing the second resultant matrix, simultaneously computing one-dimensional partial fast Fourier transforms of each transposed-matrix block of subsequent rows of transposed-matrix blocks, one row of transposed-matrix blocks at a time, until one-dimensional partial fast Fourier transforms are computed for each transposed-matrix block.

3. The method of claim 2, wherein the transposed matrix and the second resultant matrix are the same matrix.

4. The method of claim 1, further comprising the step of:
   identifying when the one-dimensional partial fast Fourier transform of each block is completed.

5. The method of claim 1, further comprising the step of:
   identifying when the one-dimensional fast Fourier transform of each transposed-matrix block is completed.

6. The method of claim 1, wherein the original matrix and the resultant matrix are the same matrix.

7. A computer-implemented method in a data processing system having a plurality of processors and a program for computing a multidimensional fast Fourier transform of an original matrix having rows and columns of data, the method comprising the steps of:
   dividing the original matrix into a number of blocks of data, each block including at least one datum, the number of columns of data in each block being less than a total number of columns of data of the original matrix;
   a first of the plurality of processors locking a column of blocks and computing a one-dimensional partial fast Fourier transform of each block in the column of blocks, a result of the computations being stored in a resultant matrix having rows and columns;
   a second processor of the plurality of processors transposing the resultant matrix to a transposed matrix having rows and columns, the transposed matrix being a completed multidimensional fast Fourier transform result stored in a data structure in a memory of the data processing system; and
   while transposing the resultant matrix, at least a third processor of the plurality of processors simultaneously computing one-dimensional partial fast Fourier transforms of each block of subsequent columns of blocks, one column of blocks at a time, until one-dimensional partial fast Fourier transforms are computed for each block.

8. The method of claim 7, further comprising the steps of:
   dividing the transposed matrix into a number of transposed-matrix blocks, each transposed-matrix block including at least datum, the number of columns in each transposed-matrix block being less than a total number of blocks of the transposed matrix;
   computing a one-dimensional partial fast Fourier transform of each transposed-matrix block in a column of transposed-matrix blocks, a result of the computations being stored in a second resultant matrix having rows and columns;
   transposing the second resultant matrix to a final matrix having rows and columns; and
   while transposing the second resultant matrix, simultaneously computing one-dimensional partial fast Fourier transforms of each transposed-matrix block of subsequent columns of transposed-matrix blocks, one column of transposed-matrix sections at a time, until one-dimensional partial fast Fourier transforms are computed for each transposed-matrix section.

9. The method of claim 8, wherein the transposed matrix and the second resultant matrix are the same matrix.

10. The method of claim 7, further comprising the step of:
    identifying when the one-dimensional partial fast Fourier transform of each section is completed.

11. The method of claim 7, further comprising the step of:
    identifying when the one-dimensional partial fast Fourier transform of each transposed-matrix section is completed.

12. The method of claim 7, wherein the original matrix and the resultant matrix are the same matrix.

13. A computer-readable medium containing instructions that cause a data processing system having a plurality of processors and a program to perform a computer-implemented method for computing a multidimensional fast Fourier transform of an original matrix having rows and columns of data, the method comprising the steps of:
- dividing the original matrix into a number of blocks of data, each block including at least one datum, the number of rows of data in each block being less than a total number of rows of data in the original matrix;
- a first of the plurality of processors locking a row of blocks and computing a one-dimensional partial fast Fourier transform of each block in the row of blocks, a result of the computations being stored in a resultant matrix having rows and columns;
- a second of the plurality of processors transposing the resultant matrix to a transposed matrix having rows and columns, the transposed matrix being a completed multidimensional fast Fourier transform result that is stored in a data structure in a memory of the data processing system; and
- while transposing the resultant matrix, at least a third of the plurality of processors simultaneously computing one-dimensional partial fast Fourier transforms of each block of subsequent rows of blocks, one row of blocks at a time, until one-dimensional partial fast Fourier transforms are computed for each block.

14. The computer-readable medium of claim 13, further comprising the steps of:
- dividing the transposed matrix into a number of transposed-matrix blocks, each transposed-matrix block including at least one datum, the number of rows in each transposed-matrix block being less than a total number of rows of the transposed matrix;
- computing a one-dimensional partial fast Fourier transform of each transposed-matrix block in a row of transposed-matrix blocks, a result of the computations being stored in a second resultant matrix having rows and columns;
- transposing the second resultant matrix to a final matrix having rows and columns; and
- while transposing the second resultant matrix, simultaneously computing one-dimensional partial fast Fourier transforms of each transposed-matrix block of subsequent rows of transposed-matrix blocks, one row of transposed-matrix blocks at a time, until one-dimensional partial fast Fourier transforms are computed for each transposed-matrix block.

15. The computer-readable medium of claim 13, further comprising the step of:
- identifying when the one-dimensional partial fast Fourier transform of each block is completed.

16. The computer-readable medium of claim 13, further comprising the step of:
- identifying when the one-dimensional fast Fourier transform of each transposed-matrix block is completed.

17. The computer-readable medium of claim 13, wherein the original matrix and the resultant matrix are the same matrix.

18. The computer-readable medium of claim 14, wherein the transposed matrix and the second resultant matrix are the same matrix.

19. A computer-readable medium containing instructions that cause a data processing system having a plurality of processors and a computer-implemented program to perform a method for computing a multidimensional fast Fourier transform of an original matrix having rows and columns of data, the method comprising the steps of:
- dividing the original matrix into a number of blocks of data, each block including at least one datum, the number of columns of data in each block being less than a total number of columns of data of the original matrix;
- a first processor of the plurality of processors locking a column of blocks and computing a one-dimensional partial fast Fourier transform of each block in the column of blocks, a result of the computations being stored in a resultant matrix having rows and columns;
- a second processor of the plurality of processors transposing the resultant matrix to a transposed matrix having rows and columns, the transposed matrix being a completed multidimensional fast Fourier transform result that is stored in a data structure in a memory of the data processing system; and
- while transposing the resultant matrix, at least a third processor of the plurality of processors simultaneously computing one-dimensional partial fast Fourier transforms of each block of subsequent columns of blocks, one column of blocks at a time, until one-dimensional partial fast Fourier transforms are computed for each block.

20. The computer-readable medium of claim 19, further comprising the steps of:
- dividing the transposed matrix into a number of transposed-matrix blocks, each transposed-matrix block including at least datum, the number of columns in each transposed-matrix block being less than a total number of blocks of the transposed matrix;
- computing a one-dimensional partial fast Fourier transform of each transposed-matrix block in a column of transposed-matrix blocks, a result of the computations being stored in a second resultant matrix having rows and columns;
- transposing the second resultant matrix to a final matrix having rows and columns; and
- while transposing the second resultant matrix, simultaneously computing one-dimensional partial fast Fourier transforms of each transposed-matrix block of subsequent columns of transposed-matrix blocks, one column of transposed-matrix sections at a time, until one-dimensional partial fast Fourier transforms are computed for each transposed-matrix section.

21. The computer-readable medium of claim 20, wherein the transposed matrix and the second resultant matrix are the same matrix.

22. The computer-readable medium of claim 19, further comprising the step of:
- identifying when the one-dimensional partial fast Fourier transform of each section is completed.

23. The computer-readable medium of claim 19, further comprising the step of:
- identifying when the one-dimensional partial fast Fourier transform of each transposed-matrix section is completed.

24. The computer-readable medium of claim 19, wherein the original matrix and the resultant matrix are the same matrix.

25. A computer-implemented data processing system for computing a multidimensional fast Fourier transform of an original matrix having rows and columns of data, the data processing system comprising:
   a plurality of processing units; and
   a memory comprising a program that:
      divides the original matrix into a number of blocks of data, each block including at least one datum, the number of columns of data in each block being less than a total number of columns of data of the original matrix;
      on a first processing unit of the plurality of processing units, locks a column of blocks and computes a one-dimensional partial fast Fourier transform of each block in the column of blocks, a result of the computations being stored in a resultant matrix having rows and columns;
      on a second processing unit, transposes the resultant matrix to a transposed matrix having rows and columns, the transposed matrix being a completed multidimensional fast Fourier transform result that is stored in a data structure in a memory of the data processing system; and
      while transposing the resultant matrix, on at least a third processing unit of the plurality of processing units, simultaneously computes one-dimensional partial fast Fourier transforms of each block of subsequent columns of blocks, one column of blocks at a time, until one-dimensional partial fast Fourier transforms are computed for each block.

26. The data processing system of claim 25, wherein the program divides the transposed matrix into a number of transposed-matrix blocks, each transposed-matrix block including at least one datum, the number of rows in each transposed-matrix block being less than a total number of rows of the transposed matrix;
   computes a one-dimensional partial fast Fourier transform of each transposed-matrix block in a row of transposed-matrix blocks, a result of the computations being stored in a second resultant matrix having rows and columns;
   transposes the second resultant matrix to a final matrix having rows and columns; and
   while transposing the second resultant matrix, simultaneously computes one-dimensional partial fast Fourier transforms of each transposed-matrix block of subsequent rows of transposed-matrix blocks, one row of transposed-matrix blocks at a time, until one-dimensional partial fast Fourier transforms are computed for each transposed-matrix block.

27. The data processing system of claim 25, wherein the processing unit comprises a plurality of parallel-processing processing units.

28. The data processing system of claim 25, wherein one of the parallel-processing processing units transposes the resultant matrix while a different parallel-processing processing unit computes the fast Fourier transform of one of the sections.

29. A computer-implemented data processing system for computing a multidimensional fast Fourier transform of an original matrix having rows and columns of data, the data processing system comprising:
   a plurality of processing units; and
   a memory having a program that:
      divides the original matrix into a number of blocks of data, each block including at least one datum, the number of columns of data in each block being less than a total number of columns of data of the original matrix;
      on a first processing unit of the plurality of processing units, locks a column of blocks and computes a one-dimensional partial fast Fourier transform of each block in the column of blocks, a result of the computations being stored in a resultant matrix having rows and columns;
      on a second processing unit of the plurality of processing units, transposes the resultant matrix to a transposed matrix having rows and columns, the transposed matrix being a completed multidimensional fast Fourier transform result that is stored in a data structure in a memory of the data processing system; and
      while transposing the resultant matrix, on at least a third processing unit of the plurality of processing units, simultaneously computes one-dimensional partial fast Fourier transforms of each block of subsequent columns of blocks, one column of blocks at a time, until one-dimensional partial fast Fourier transforms are computed for each block.

30. The data processing system of claim 29, wherein the program divides the transposed matrix into a number of transposed-matrix blocks, each transposed-matrix block including at least datum, the number of columns in each transposed-matrix block being less than a total number of blocks of the transposed matrix;
   computes a one-dimensional partial fast Fourier transform of each transposed-matrix block in a column of transposed-matrix blocks, a result of the computations being stored in a second resultant matrix having rows and columns;
   transposes the second resultant matrix to a final matrix having rows and columns; and
   while transposing the second resultant matrix, simultaneously computes one-dimensional partial fast Fourier transforms of each transposed-matrix block of subsequent columns of transposed-matrix blocks, one column of transposed-matrix sections at a time, until one-dimensional partial fast Fourier transforms are computed for each transposed-matrix section.

31. The data processing system of claim 29, wherein the processing unit comprises a plurality of parallel-processing processing units.

32. The data processing system of claim 29, wherein one of the parallel-processing processing units transposes the resultant matrix while a different parallel-processing processing unit computes the fast Fourier transform of one of the sections.

33. A computer-implemented data processing system for computing a multidimensional fast Fourier transform of an original matrix having rows and columns of data, the data processing system comprising:
   means for dividing the original matrix into a number of blocks of data, each block including at least one datum, the number of rows of data in each block being less than a total number of rows of data in the original matrix;
   means for a first processor of a plurality of processors locking a row of blocks and computing a one-dimensional partial fast Fourier transform of each block in a row of blocks, a result of the computations being stored in a resultant matrix having rows and columns;

means for a second processor of the plurality of processors transposing the resultant matrix to a transposed matrix having rows and columns, the transposed matrix being a completed multidimensional fast Fourier transform result that is stored in a data structure in a memory of the data processing system; and means for, while transposing the resultant matrix, at leas a third processor of the plurality of processors simultaneously computing one-dimensional partial fast Fourier transforms of each block of subsequent rows of blocks, one row of blocks at a time, until one-dimensional partial fast Fourier transforms are computed for each block.

* * * * *